United States Patent
Oakes, III et al.

(10) Patent No.: US 8,719,838 B1
(45) Date of Patent: May 6, 2014

(54) SYSTEMS AND METHODS FOR GENERATING SCRIPTS TO INTERACT WITH WEB SITES

(75) Inventors: Charles Lee Oakes, III, Boerne, TX (US); Randy Ray Morlen, San Antonio, TX (US); Teddy Joseph Edmond Voutour, Helotes, TX (US); Rickey D. Burks, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1073 days.

(21) Appl. No.: 12/127,913

(22) Filed: May 28, 2008

(51) Int. Cl.
- *G06F 3/00* (2006.01)
- *G06F 9/44* (2006.01)
- *G06F 9/46* (2006.01)
- *G06F 13/00* (2006.01)
- *G06F 21/31* (2013.01)

(52) U.S. Cl.
CPC ..................................... *G06F 21/31* (2013.01)
USPC ....................................................... 719/311

(58) Field of Classification Search
CPC ....................................................... G06F 21/31
See application file for complete search history.

(56) References Cited

U.S. PATENT DOCUMENTS

| | | | |
|---|---|---|---|
| 6,871,213 B1 | 3/2005 | Graham et al. | |
| 6,981,028 B1* | 12/2005 | Rawat et al. | 709/217 |
| 2001/0027439 A1 | 10/2001 | Holtzman et al. | |
| 2002/0035498 A1* | 3/2002 | Kehoe et al. | 705/8 |
| 2005/0187930 A1* | 8/2005 | Subramanian et al. | 707/4 |
| 2006/0206801 A1 | 9/2006 | Maxwell et al. | |
| 2007/0022085 A1 | 1/2007 | Kulkarni | |
| 2007/0180380 A1 | 8/2007 | Khavari et al. | |

* cited by examiner

*Primary Examiner* — Charles E Anya
*Assistant Examiner* — Timothy A Mudrick
(74) *Attorney, Agent, or Firm* — Brooks, Cameron & Huebsch, PLLC

(57) ABSTRACT

Interaction with a web site may be driven by a script. The script may be generated through automated analysis of a web site. A web site may be analyzed by evaluating labels associated with data entry fields, links, and/or other elements of the pages that make up the web site. Moreover, a web site may be analyzed by co-browsing the web site along with a human, and observing the actions that a human takes to operate the web site. The scripts that are generated may be used to perform a transaction at a web site on behalf of a principal, to gather information from a web site, or to perform any other type of action.

18 Claims, 7 Drawing Sheets

SYSTEMS AND METHODS FOR GENERATING SCRIPTS TO INTERACT WITH WEB SITES

CROSS REFERENCE TO RELATED APPLICATIONS

This application is related to U.S. patent application Ser. No. 12/233,868 filed Sep. 19, 2008 and U.S. patent application Ser. No. 12/233,874 filed Sep. 19, 2008, filed as divisional applications of the instant application, the disclosures of which are incorporated in their entirety.

BACKGROUND

Interaction with web sites may include actions such as entering information into forms, following links, activating buttons, etc. These actions may be performed by a person who interacts with the web site through a web browser. But the process of interacting with a web site need not be performed by a person, and could be automated by using software to interact with the site.

One example of software that may interact with a web site is a script engine. In this example, the script engine carries out instructions in a script. The script describes the operation to be performed in order to interact with the web site. The script engine may contain the basic logic to interact with web sites. For example, the engine might have the ability to issue Hypertext Transfer Protocol (HTTP) request, follow links, enter information into fields, etc. The script may then identify the particular operations to be performed—e.g., the particular Uniform Resource Locators (URLs) to be visited, particular links to be followed, particular values to be entered into fields, etc.

In general, scripts that drive interaction with a web site are written by humans, based on manual analysis of the web site. There are some commercial providers of scripts. However, the scripts obtained from these commercial providers are normally written and/or updated by humans. This writing is usually based on manual analysis of the web sites for which the scripts are written. Providing a script normally entails not only analyzing the web site and writing the script initially, but also maintaining and updating the script to keep up with changes to the web site. Due to the cost of using human labor to perform these tasks, it may be commercially infeasible to use human labor to write scripts for the web sites of businesses other than those that have a very large number of customers.

SUMMARY

A script to interact with a web site may be generated by a script-generation program. Script generation may be performed by analyzing the web site to identify and interpret data entry fields and links on the web site, and/or by a co-browse operation in which a human user's interaction with the web site is observed.

For example, a script generation program may be used to create a script that enters a person's customer number and password into a financial service's institution's web site. The script generation program may analyze the institution's web site to find the fields into which the customer number and password are to be entered. Additionally or alternatively, a human user may be asked to enter the customer number and password into the web site for which the script is to be created, and the user's interaction may be observed and analyzed as a basis to create the script. (While the description herein refers at times to a user entering data into a financial services web site, the subject matter described herein may be used to generate a script that performs any type of interaction with any type of web site.)

In an example in which the web site is analyzed to identify data entry fields and links, a program that performs the analysis may look for a field in which a particular item of data (e.g., a customer number) is to be entered. The program may have a list of names that might be used for that field, and may also have a set of heuristics for resolving ambiguities in the web site under analysis. For example, the program may look for a field that asks for have data indicating that "customer_number", "member_number", and "relationship_number" are all possible labels for the field in which a customer number is to be entered. The program may have similar data indicating the possible name of the password field, and may also use heuristics, which may help to resolve ambiguous content on the web site.

A human user may be asked to interact with the web site for which a script is to be generated—e.g., by visiting the web site and entering the customer number and password combination. The user's browsing session may be observed, and a program may generate the script based on what has been observed about the browsing session. Script generation may be performed by analyzing the content of the web site, observing a human user's interaction of the web site, or any combination of these and/or other techniques.

This summary is provided to introduce a selection of concepts in a simplified form that are further described subsequently in the detailed description. This summary is not intended to identify key features or essential features of the claimed subject matter, nor is it intended to be used to limit the scope of the claimed subject matter.

DETAILED DESCRIPTION

Figure 1:
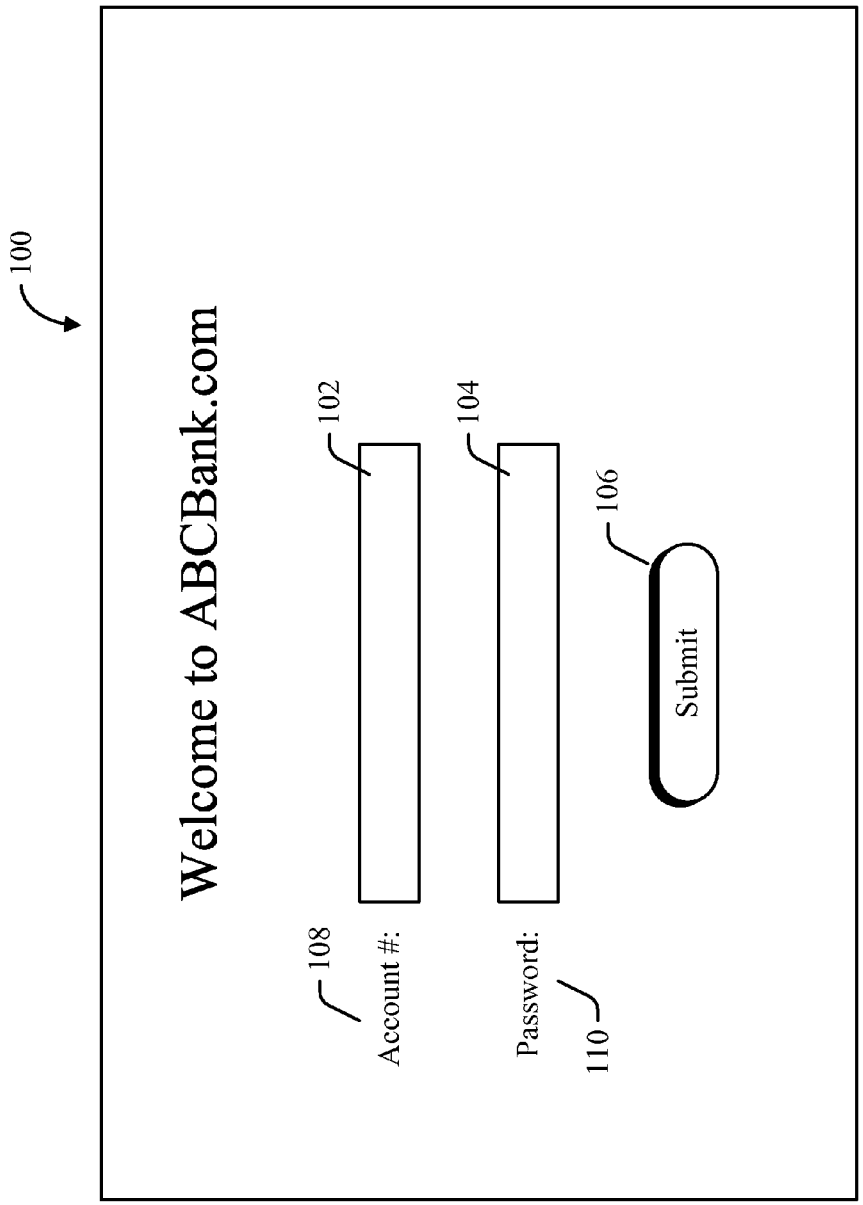
FIGS. 1 and 2 are block diagrams of example pages in a web site.

Web sites are normally used to enable human interaction with a computer. For example, an organization, such as a bank, may operate a web site to allow human customer of the bank to interact with the bank's computer system. Through these interactions, the user may perform deposits, withdrawals, transfers, payments, etc. While web sites are normally implemented to enable human interaction with a computer system, the interaction with a web site may be performed by a program instead of a human. For example, a script engine may execute a script that interacts with a particular web site.

The use of a script to operate a web site occurs in a variety of contexts. For example, a customer may wish to transfer money from Bank A to Bank B. Since Bank B is receiving the transfer, Bank B may wish to help the customer perform this transfer. To this end, the Bank B may solicit the credentials (e.g., account number, password, etc.) that the customer uses at Bank A, and then may perform a withdrawal transaction on Bank A's web site using the customer's credentials. Bank B may tender the customer's credentials and perform a withdrawal by using a script to operate Bank B's web site. As another example, some e-mail programs (e.g., e-mail clients that operate on handheld devices) retrieve a user's mail by using a script to interact with the web-mail interface of the user's e-mail host. The following are some further examples of where a script could be used to operate a web site:

- A government entity that acts as a property registrar could operate a web site that exposes an interface to the database of property records. A script could be used to access the property registrar's web site in order to obtain property values or other information from the site.
- An employer could operate a web site that provides password-controlled access to payroll records, for use by employees. A financial instruction and/or financial planner (e.g., with the employee's permission) could use a script to obtain salary and other payroll information for the employee, who may be a customer of that financial institution.
- One financial institution could operate a web site that provides password-controlled access to information about its customer's accounts—e.g., auto loans, home loans, insurance, credit cards, etc. A second financial institution that has a customer in common with the first financial institution could (with the customer's permission) use a script to obtain information about the customer's finances form the first financial institution's web site.
- A web site that helps users to plan moves from one location to another could use scripts to obtain, from other web sites, information that is of interest to a particular user. For example, a person who is moving may be interested in schools, recreation, taxes, etc., at the location he or she is moving to. A move-oriented web site could have scripts that operate the web sites of school districts, taxing authorities, park authorities, etc., and could use these scripts to obtain information at the user's request.

The foregoing are merely examples, and scripts may be used to interact with any type of web site in any context. Moreover, scripts may be used to interact with a web site either in a "batch" context (e.g., using the scripts to exchange information with other web sites overnight when data traffic is low), or could be used to exchange information in real-time (e.g., a user could be using a move-oriented web site to find out information about the schools where he or she is moving to; a script could be used to obtain, in real-time, information that has been specifically requested by the user).

Normally, scripts are hand-written based on a human-performed analysis of the web site. However, writing of scripts by hand is labor intensive and, therefore, expensive. To justify the cost, scripts are normally written for the web sites of large commercial institutions (e.g., large banks with national clientele), but not for web sites of smaller entities. Manual writing of scripts for lesser-used web sites is generally not economically feasible.

The subject matter described herein provides for generation of scripts that operate web sites. The generation of scripts may be performed by a computer program. One way to generate such a script is to analyze items of text that appears on the web site's pages—e.g., by analyzing the form-field labels on a web page, the links in the page, the labels or names associated with those links (e.g., the text that a user sees on a browser), etc.—in order to determine what the web site appears to be doing. This analysis may be accomplished by maintaining lists of potential names for certain types of information. For example, such a list might specify that a data-entry field for a "customer number" could be labeled with that name, but could also be labeled "membership number", "relationship number", "account number", etc. Similarly, a data-entry field that asks for a password might be labeled "password", "secret code", "personal identification number (PIN)", etc. Additionally, finding certain information or performing certain actions on a web site may involve following links. The links may be analyzed to determine what actions may be performed or what information may be found if those links are followed. For example, the page on which a customer's balance is maintained might be reached through a link named "balance", "account summary", "account synopsis", etc. Heuristics could be used to disambiguate information on a page whose meaning is not clear-cut. For example, the term "membership number" is listed, in the previous example, as one of the synonyms of "customer number". The term "member number" is not listed as a synonym of that term, but if the term "member number" appears as a label in a data-entry field, application of a heuristic might allow this term to be disambiguated as a synonym for "customer number." For example, a heuristic might state, "If the label under analysis does not literally match any known term, but differs from a known term by fewer than 5 letters, then it is to be considered to be a synonym of that term." The foregoing is merely an example of a heuristic. Any type of heuristic may be used.

Various systems use cues such as the text in a web page to analyze the web page. However, the subject matter described herein may use analysis of the text on the web page to generate a script that may be used in the future to operate the web page.

In addition to analysis of the text on a web page, another way to generate a script is to perform an analysis of a browsing session through co-browsing technology. In this scenario, a human may be asked to navigate a web site and to perform a specific action. Co-browsing technology may be used to observe the user's behavior as he or she navigates the web site—e.g., by observing what information the user enters, in what sequence, with what time, what buttons are pushed, what links are followed, what data the web site responds with, etc. This observed information may then be analyzed by a script generation program, which may use this information to generate a script that may be used for future navigation of the web site. The observation of browsing may be recorded as the browsing occurs, and the record may be used to analyze an interaction with the web site.

Figure 2:
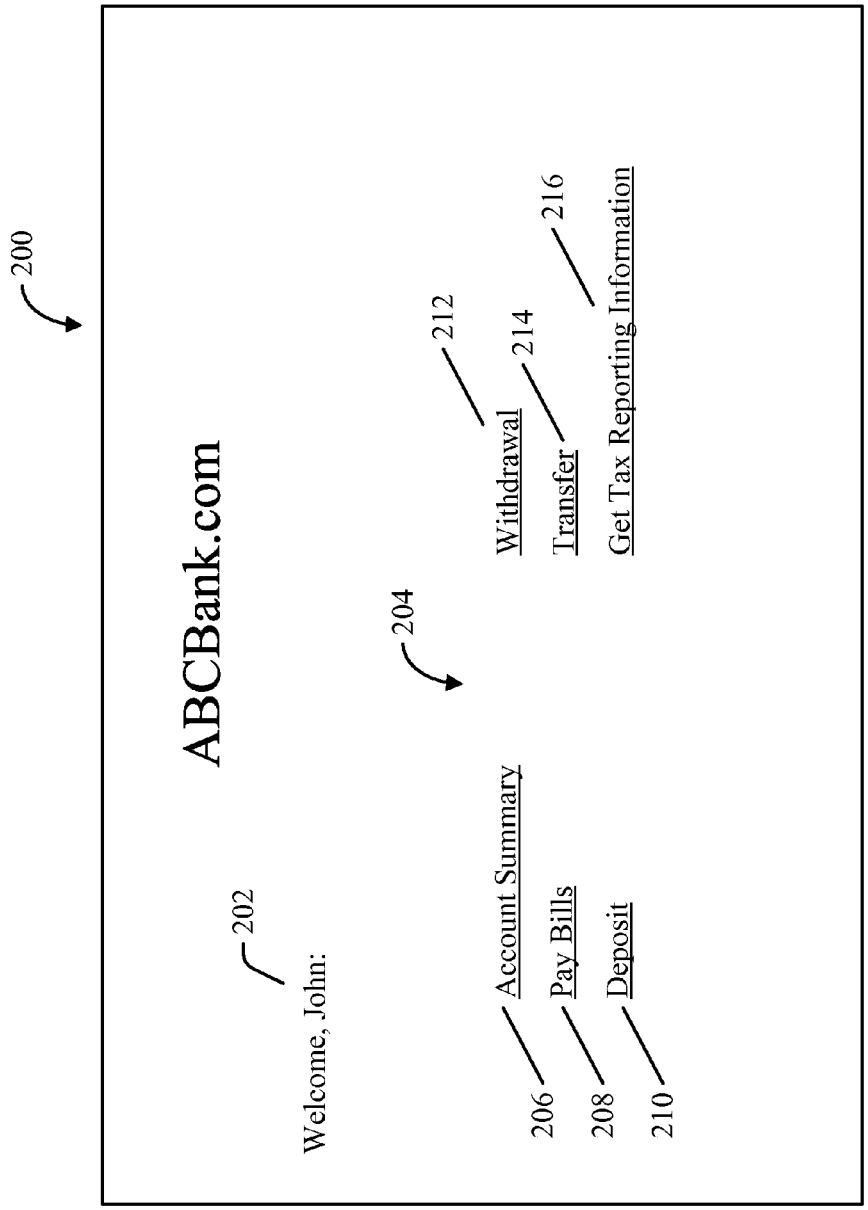

Turning now to the drawings, FIGS. 1 and 2 show examples of pages in a web site, which could be analyzed in order to generate scripts to interact with those pages.

FIG. 1 shows an example page 100, as it might be viewed on a web browser. In this example, page 100 is part of the web site for ABC Bank, although the subject matter herein applies to any web pages and any web sites.

Page 100 includes data-entry fields 102 and 104. Fields 102 and 104 contain spaces in which data may be entered. Page 100 also includes a submit button 106. When data is entered into fields 102 and 104, activating submit button 106 may cause the entered data to be sent to a web server, where the data may be used as input for some process. For example, on page 100, field 102 has label 108 and field 104 has label 110, indicating that these fields are soliciting an "Account #" and "Password", respectively. If a user activates submit button 106, the data entered into these fields may be transmitted to a web server, which may attempt to validate the account number and password combination that has been submitted. Fields 102 and 104, and button 106, are examples of elements on a web page. (The word "submit" may be viewed as a label associated with the button element, and this label may help an analysis and script-generation process to ascertain the meaning of the submit button—just like the labels associated with fields 102 and 104 may assist in analysis of the data-entry fields.)

If the account number and password combination submitted in connection with page 100 is validated, then the user who tendered the account number and password combination may be "logged in" to the web site for ABC Bank. At this point, the web site might cause page 200, as shown in FIG. 2, to be rendered. Page 200 may, for example, include a welcome message 202, and one or more actions 204 that the logged-in user may take. Actions 204 may be specified, for example, as links to other pages on the web site, where each linked page assists the user to perform a different function. These functions, as shown on page 200, might include: obtaining an account summary, paying bills, making a deposit, making a withdrawal, making a transfer, and getting tax reporting information. Each of these links may be identified by a particular one of names 206, 208, 210, 212, 214 and 216. In the example of FIG. 2, the names are: "account summary", "pay bills", "deposit", etc. These names, as discussed subsequently, may be used to assist an analysis process in determining what types of functions might be performable when the links are followed. The links, like the previously-discussed data-entry fields and buttons, are examples of elements on a web page.

FIGS. 1 and 2 show pages 100 and 200, which are part of an example banking web site. While a banking web site is one example of a web site that could be analyzed in order to generate a script, any type of web site could be analyzed. For example, various types of web sites allow information to be entered and/or actions to be performed. Government web sites, real estate web sites, automobile web sites, school district web sites, etc., are all further examples of web sites that might allow a user to enter information and/or perform some actions. A script could be generated for any of these web sites, or any other type of web site.

While the subject matter described herein may apply to any type of web site, one scenario in which one entity may wish to use a script to operate another entity's web site is in the case where a customer has relationships with two organizations, and one of the organizations wishes to log in as its customer on the other organization's web site (with the customer's permission). One example scenario is where the organizations are two different financial institutions that have a customer in common. For example, a customer may have accounts at Bank A and Bank B, and Bank A may wish to log into Bank B's web site as the customer in order to facilitate a transfer of money from the customer's account with Bank B to the customer's account with Bank A. As another example, one financial institution may offer the service of providing aggregated financial statements, as in the case where one mutual fund company allows a customer to see his or her entire equity portfolio on that company's web site. This may be accomplished by collecting the customer's account name and password on other companies' web sites, so that the company may log into those web sites and collect the user's portfolio information to create one aggregate statement. The situation in which a single customer has relationships with different organizations is shown in FIG. 3.

Figure 3:
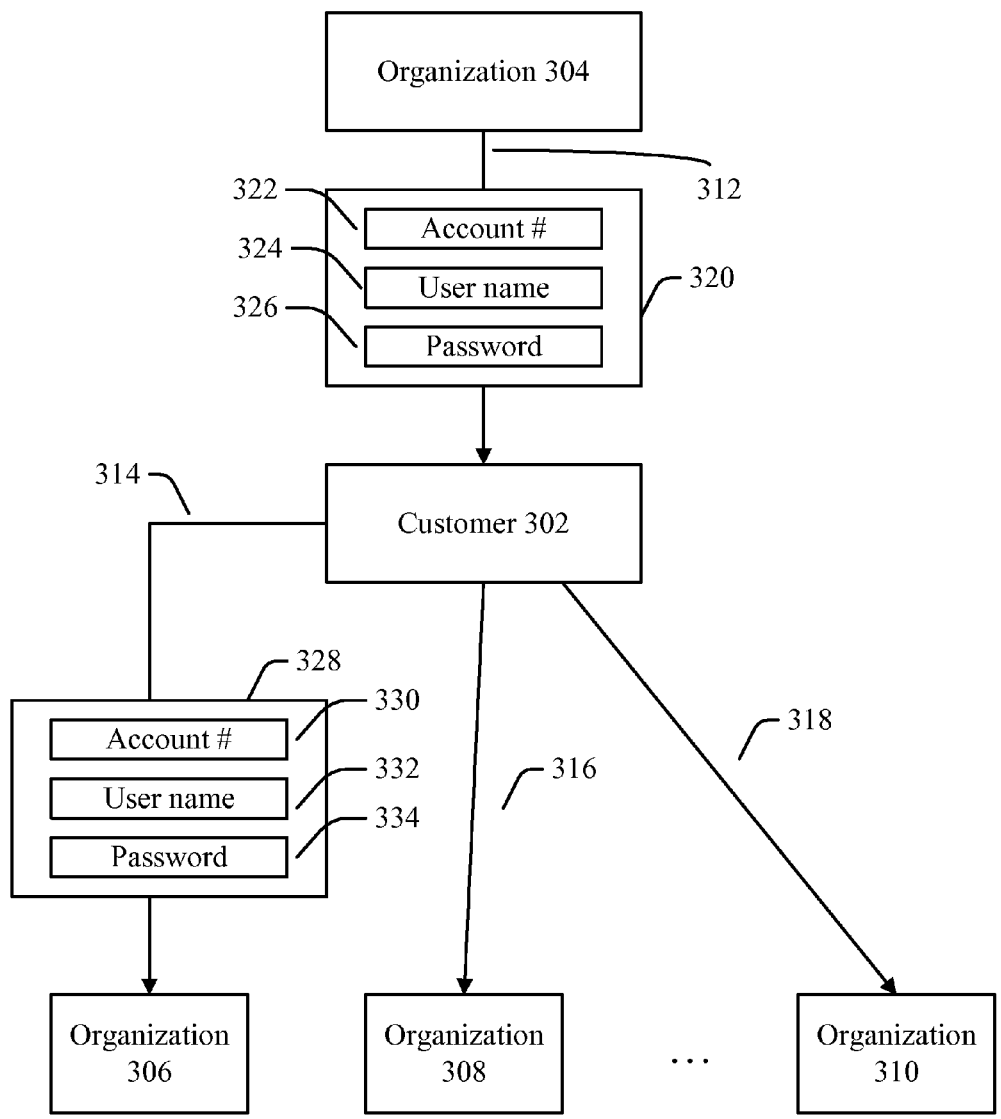
FIG. 3 is a block diagram of example relationships between a customer and a plurality of organizations.

In FIG. 3, there is a customer 302 and one or more organizations, such as organizations 304, 306, 308, and 310. Organizations 304-310 may, for example, be financial institutions, on-line sellers, service providers, or any other type of organization. Customer 302 has relationships 312, 314, 316, and 318, respectively, with organizations 304, 306, 308, and 310.

One aspect of customer 302's relationship with organization 304 is a set of credentials 320. These credentials may include, for example, account number 322, user name 324, and/or password 326. For example, organization 304 may operate a web site (such as that depicted in FIGS. 1-2), and customer 302 may gain access to that web site using credentials 320.

Customer 302 may also have a set of credentials 328 with organization 306. Credentials 328 may be part of relationship 314 between customer 302 and organization 306. Credentials 328 may include, for example, account number 330, user name 332, and/or password 334. The account number, user name, and/or password in credentials 328 may be different from those in credentials 320 (and, most likely, these two sets of credentials would contain at least some differences, such as having different account numbers). Customer 302's relationships 316 and 318 with organizations 308 and 310, respectively, may also include credentials (not shown) that may be used with those organizations or their web sites.

Organization 304 may want to use customer 302's credentials on a web site operated by organization 306. Organization 304 (through its web site, perhaps) may ask customer 302 to provide, to organization 304, the credentials 328 that customer 302 has with organization 306. Organization 304 may also request customer 302's permission to use these credentials to log in as customer 302 on organization 306's web site. Organization 304 may then use these credentials by logging into organization 306's web site as customer 302. This use of the credentials, and any other interaction between organization 304 and organization 306's web site, may be performed by executing a script that interacts with organization 306's web site. While the subject matter described herein is in no way limited to the use of a script to tender credentials, the case in which one organization wishes to log in to another organization's web site on behalf of a customer these two organization have in common, is an example in which a script may be used to interact with web sites. However, such a script may be used in any context and with any type of web site.

Figure 4:
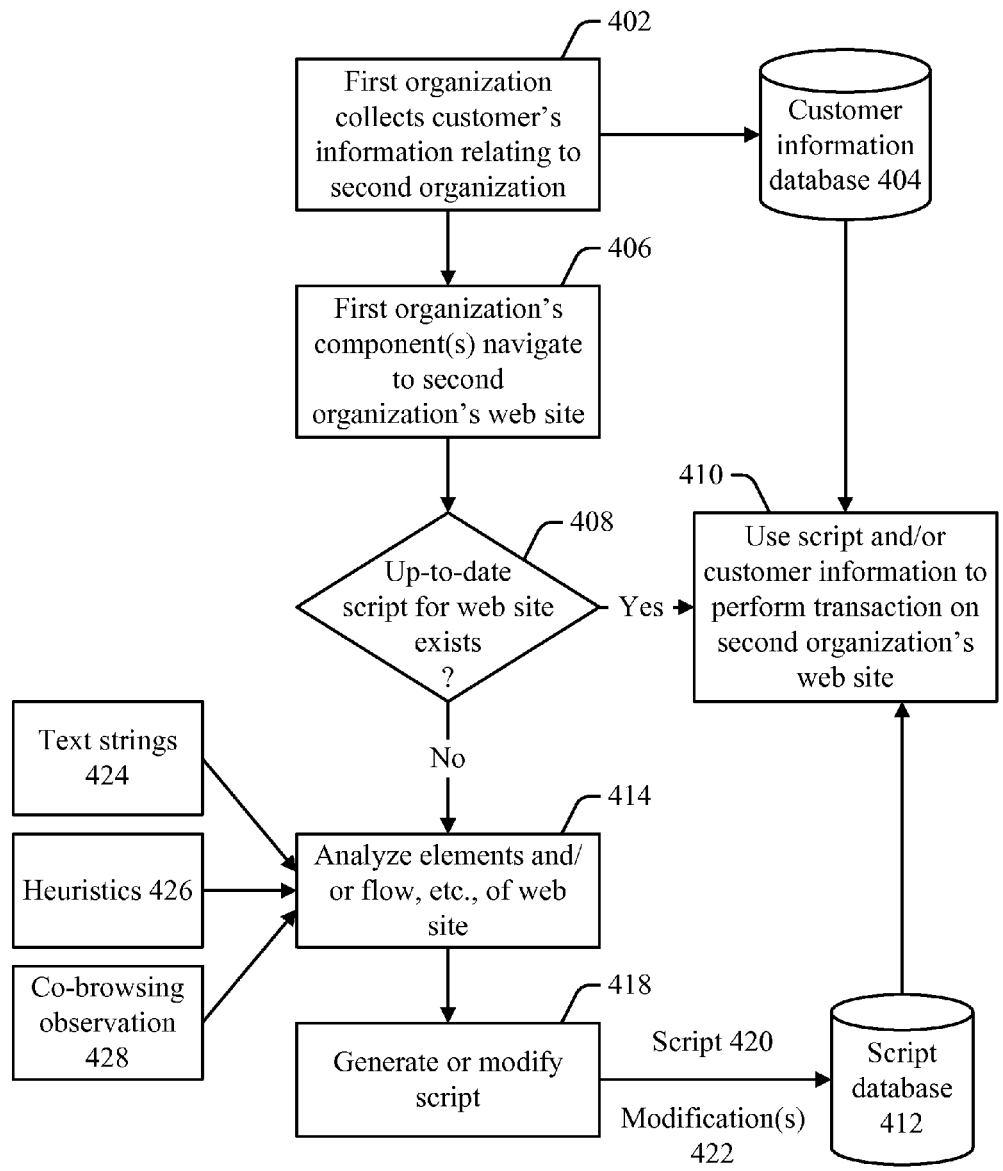
FIG. 4 is a flow diagram of an example process in which a script may be generated.

FIG. 4 shows an example process in which a script is generated or changed and/or used. In FIG. 4, the process is described in terms of an example in which a script is used by a first organization to perform a transaction on behalf of a customer at a second organization's web site. However, as previously noted, scripts may be generated and used in any context, of which merely one example is the performance of a financial transaction on the web site of a financial institution. Additionally, the flow diagram in FIG. 4 (as well as the flow diagram in FIG. 6, discussed subsequently) shows an example in which stages of a process are carried out in a particular order, as indicated by the lines connecting the blocks, but the various stages shown in the diagrams presented herein may be performed in any order, or in any combination or sub-combination.

At 402, a first organization may collect, from its customer, information relating to the customer's relationship with a second organization. For example, the first organization may collect the sign-on credentials that the customer uses to access the second organization's web site, such as user name, bank account number, password, etc. The first organization may store this information in customer information database 404.

At 406, a component that the first organization owns or operates navigates to the second organization's web site. For example, the first organization may operate a server that runs automatic web navigation software—e.g., a "bot"—that interacts with web sites with little or no human interaction.

If there is an up-to-date script for the web site (at 408), then that script and/or customer information are used to perform a transaction on the second organization's web site (at 410). The question of whether there is an up-to-date script for the web site may include determining whether there is a script at all, and whether the script allows accurate navigation of the current state of the web site. For example, there may be no script at all for a particular web site, in which case no up-to-date script is found at 408. As another example, there may be a script, but the web site may have changed since the script was created, such that the script no longer facilitates navigation of the web site. This is another example in which an up-to-date script would not be found to exist at 408. However, if a script is found, and if the script accurately facilitates navigation of the web site in its current state, then an up-to-date script is found to exist at 408, and this script may be used to perform a transaction on the web site. The script may be stored in, and retrieved from, script database 412. Moreover, the script may make use of certain other information, such as customer information stored in customer information database 404. For example, the script may cause a customer's login credentials to be tendered to a web site. In this case, the script that describes how to tender the credentials may be retrieved from script database 412, and the credentials may be retrieved from customer information database 404.

If no up-to-date script is found to exist at 408, then the elements, flow, etc., of the web site are analyzed (at 414), and a script (or a modification to a script) may be generated based on this analysis. The new script 420, or a modification 422 to an existing script, may then be stored in script database 412, so that such script may be used to perform a transaction.

Returning to 414, it is noted that the analysis of a web site that facilitates generation of a script may be informed by various types of information. In one example, a web site is analyzed and understood based on the text that appears in the web site. A page that is part of the web site may include various elements, such as data entry fields, links to other pages, etc. The text to be analyzed may include labels for data-entry fields and links to other parts of the web site, although these are merely specific examples of the text to be analyzed, and any other types of text may be analyzed. Analysis of the labels associated with form fields may assist in generating a script, since these labels may provide an indication of the types of information that a script would enter into a web site in order to navigate the site. For example, if a particular field has a label such as "user name", "password", "city", "state", "color", etc., these labels may provide an indication of a particular type of information to be entered into the site. Analysis of such labels, therefore, may assist in generation of a script. Additionally, web sites often contain links to different pages within the site, where the different pages perform different functions. For example, on a banking web site, there may be different pages named "account summary", "pay bills", "make a deposit", etc. Thus, the text associated with particular links on a page may assist in determining what links a script would follow in order to perform certain actions. For example, in order to write a script that makes a deposit on a web site, analysis of the web site may determine that a particular link is associated with the text "make a deposit", thereby suggesting that this a script could follow this link in order to find the deposit functionality on the web site.

The analysis of text on the web site may be informed by text strings 424 and/or heuristics 426. Text strings 424 are lists of strings that may have particular meaning. As previously noted, for example, the concept of soliciting the user's password may be signified by various different labels, such as "password", "authentication code", "personal identification number", etc. Text strings 424 may indicate which terms have common meanings, which may inform the script generation process where certain information may be found and/or where certain information is to be entered. For example, if the script generation process is attempting to create a script that enters a customer's password, text strings 424 may be used to identify the field on a web page into which the password is to be entered, even if the password field might be labeled with various different terms. Moreover, in some cases elements on a web site move from one place to another. If a script exists for a prior version of the web site, analysis of the text on the web site may be used to determine if items that were understood by prior versions of the script have moved from one place to another. For example, if the password-entry field has moved, but entering a password was understood by an existing version of the script, this fact could be discovered by analysis of the labels associated with fields, and the script could simply be updated to reflect the new position of the password-entry field. Examples of text strings and their usage are further discussed subsequently in connection with FIG. 5.

Another type of information that may inform the analysis of text on the web site is heuristic(s) 426. In some cases, the information found on a web site may be ambiguous, and heuristic(s) 426 may be used to determine how to disambiguate the ambiguous information. For example, if the script generation process is attempting to generate a script that tenders a user name and password, it may be the case that the web site under analysis has a first field labeled "user name", and also has a second field, but the second field is not labeled "password" or any known synonym of password. An example heuristic might state that a page that contains two data entry fields, and one of the fields is labeled "user name", then the other field is presumed to be a password field. The foregoing is an example of how a disambiguation heuristic could be used to resolve the meaning or significance of a combination of terms on a page. Another example of a disambiguation heuristic (as previously noted) is that if a data-entry-field label is unrecognized but differs from a recognized term by fewer than some number of letters (e.g., five), then the label may be presumed to have the same meaning as the recognized term. This example shows how a heuristic could be used to resolve a particular type of ambiguity in a particular way. However, heuristics could be used to resolve any type of ambiguity in any manner.

Analysis of a web site may also be informed by co-browsing observation 428. In co-browsing observation, a human user's interaction with a web site is observed. This observation may be performed, for example, using technology such as Virtual Network Computing (VNC) or Remote Desktop Protocol (RDP). Typically, VNC and RDP technologies are used to allow a person to interact with a remote computer. However, these technologies could also be used to allow a script generation and/or web-site-analysis program to interact with a human user's web browser, in order to observe what actions the human is performing on the web browser to navigate a web site. For example, if a script generation process wants to know how to tender a user name/password combination, a human user could be asked to perform this action while a script-generation program observes what the user does. In this sense, the script-generation program "co-browses" the site with a human user, and thereby learns how a human would navigate the site. This observation then provides data about the proper way to tender the credentials, and this information may be used to generate a script. There are transaction recording technologies, but the observations made while a user browses a web site may go beyond simple recording. For example, the web site may ask the user to respond to a question (e.g., the site may ask the user to enter alphanumeric characters that correspond to a graphic). If the question changes across different instantiations of the web site and/or different instances of the web pages generated by the site, then the transaction may not be reproducible by mere recording. For example, if separate visits to the web site cause different questions to be generated, then simply recording a user's reaction to the question during one interaction, and playing back that reaction during another interaction with the web site, may not be sufficient to accurately automate use of the web site. A script generation process may analyze the human interaction with the web site to determine how to perform that interaction, which may involve more than merely recording and duplicating the particular data that the user has sent.

Heuristics may be used to interpret ambiguous events that are observed during a co-browse session. For example, a user may perform an action as part of a browsing session. An analysis tool that observes the browsing session may have various possible interpretations of the user's action, and a heuristic may be used, as part of the analysis of the co-browsing, to disambiguate the meaning or significance of the user's action.

Figure 5:
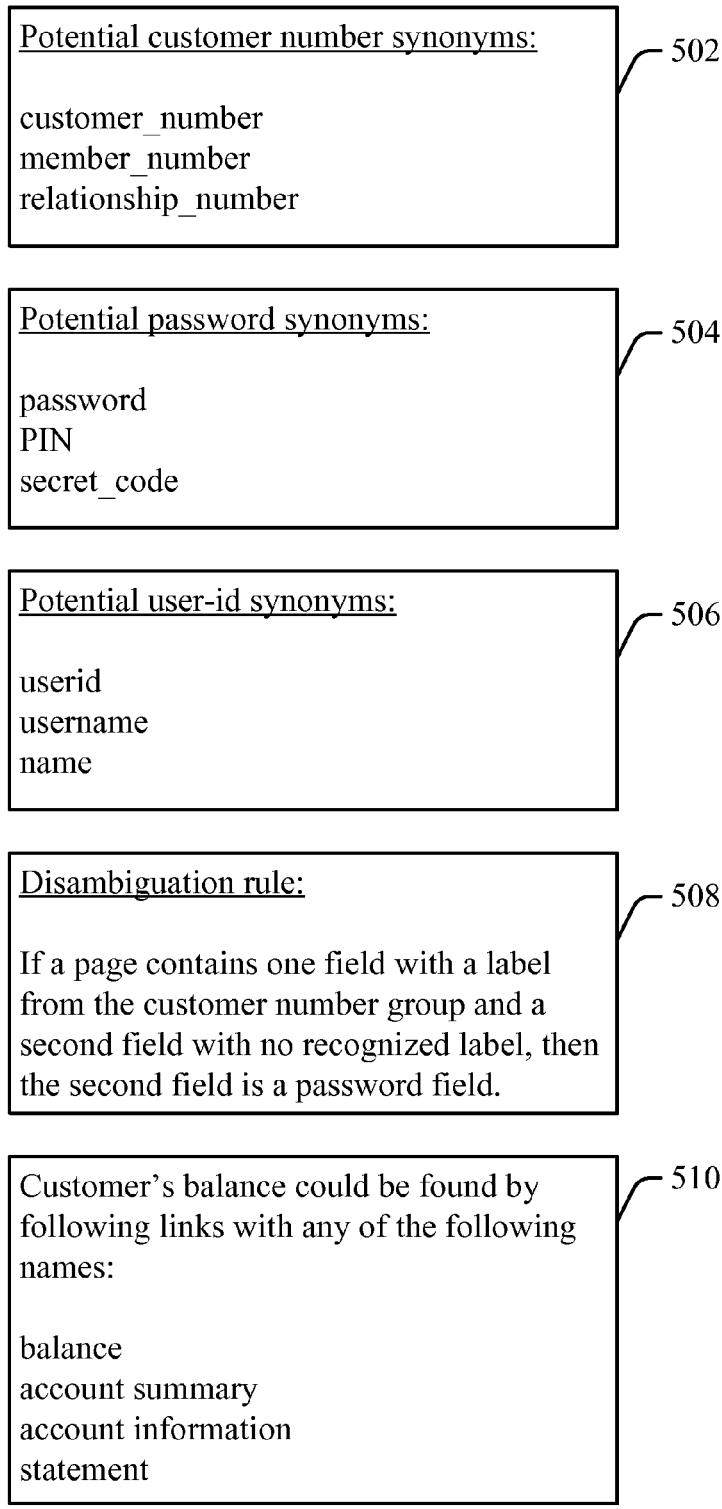
FIG. 5 is a block diagram of example information that may be used to analyze a web site.

FIG. 5 shows example information 500 that may be used to analyze a web site. Example information 500 includes both example text strings 502, 504, and 506, and example heuristics 508 and 510.

Text strings 502 include a group of possible synonyms that represent the concept of a customer number. For example, the terms "customer_number", "member_number", and "relationship_number" may all represent the concept of a customer number. Thus, if any of these terms were the label for a data entry field, that fact might signify that a customer number is to be entered into the field. For example, a script-generation process may be attempting to generate a script that enters a customer number into a field on a web page. That process may read the labels associated with the fields on the web page and compare those labels to text strings 502 in order to determine which field is (or is likely to be) the field into which to enter a customer number. This information may be used to generate the script that enters the customer number into a web page.

Similarly, text strings 504 and 506, contain possible synonyms that represent the concepts of "password" and "user-id", respectively. For example, text strings 504 indicate that "password", "PIN", and "secret_code" are labels that may identify the field into which a password is to be entered. As another example, text strings 506 indicate that "userid", "username", and "name" are labels that may identify the field into which a user-id is to be entered.

Heuristic 508 contains a disambiguation rule, which may be used to interpret a field on a web site when the field's label is not found among the synonyms contained in text strings 502, 504, and/or 506. For example, suppose that a web page is being analyzed to identify the fields into which to enter a customer number and password. In this example, one of the fields on a page has a label that matches one of text strings 502 (e.g., "customer_number"), and thus is identified as the place to enter the customer number. However, suppose there is one other field on the same page, but that field either has no label, or the label does not match any of the synonyms for password. Heuristic 508 states that, if the page contains one field that has a label from the customer number group of text strings, and also has a second field, then the second field is where to enter the password. Heuristic 508 is thus an example of a disambiguation rule, which allows the significance of the fields on a web page to be interpreted with reasonable probability in the presence of imperfect information.

Heuristic 510 is an example of another type of rule that may be applied to analyze a web site. For example, suppose that a script generation process is attempting to create a script that obtains the customer's balance. The place to find a balance is not the same on all financial web sites, and thus the script generation program may take some guesses about where to go in order to find the balance summary page. How to make these guesses may be implemented as heuristic 510. For example heuristic 510 states that links with any of the names "balance", "account summary", "account information", or "statement" may lead to a page that shows the balance. Heuristic 510 is thus an example of a rule that may be used to analyze a web site to determine what a script is to do in order to navigate the web site.

Figure 6:
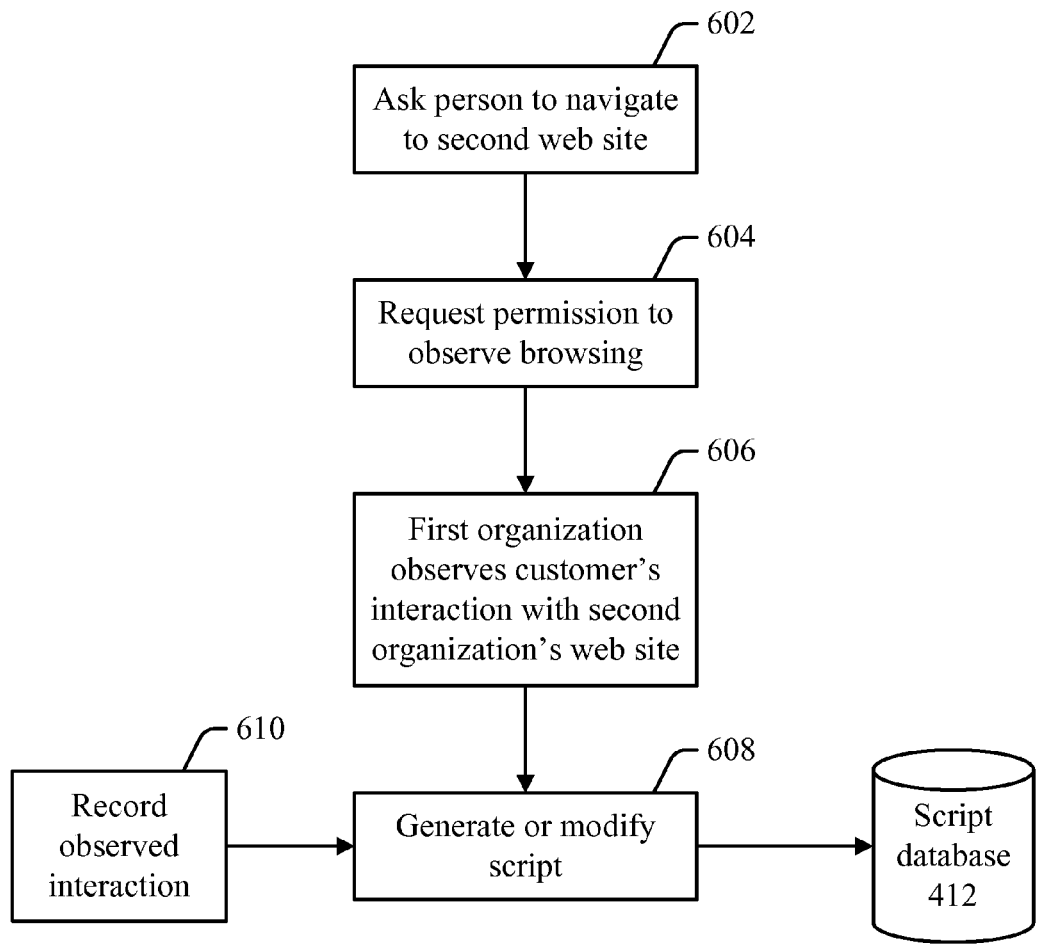
FIG. 6 is a flow diagram of an example process of generating a script based on a human's interaction with a web site.

As previously noted in connection with FIG. 4, one way to perform an analysis of a web site to support script generation is to co-browse the site with a human user. FIG. 6 shows an example process of performing such a co-browsing operation, and of generating a script based on the observations obtained during the co-browsing operation.

At 602, a person is asked to navigate to a web site. For example, a first organization that wants to be able to navigate a second organization's web site on a customer's behalf may ask the customer to navigate to the second organization's web site.

At 604, the first organization may request permission to observe the person's browsing.

At 606, the first organization observes the customer's interaction with the second organization's web site. This observation may be made using technologies such as RDP, VNC, etc. The entity observing the browsing session may be a program that collects and/or analyzes information about a browsing session as a way of creating a script.

At 608, a script is created (or an existing script is modified) based on what is observed about the browsing session. The creation (or modification) of a script may be informed based on observed information 610 that was collected during the browsing session. Once the script is generated or modified, the generated or modified script may be stored in script database 412.

When a script is used to interact with a web site, results from the interaction may be provided to a user or to another entity. These results may take any form. For example, if the script drives interaction with a web site in order to perform a financial transaction (e.g., a deposit, withdrawal, or transfer of money), a result may be an indication that the transaction has been completed. As another example, if the interaction with the web site is to obtain information, then the result could be the obtained information, a selection of the information, or an aggregation of the information obtained from several web sites.

Figure 7:
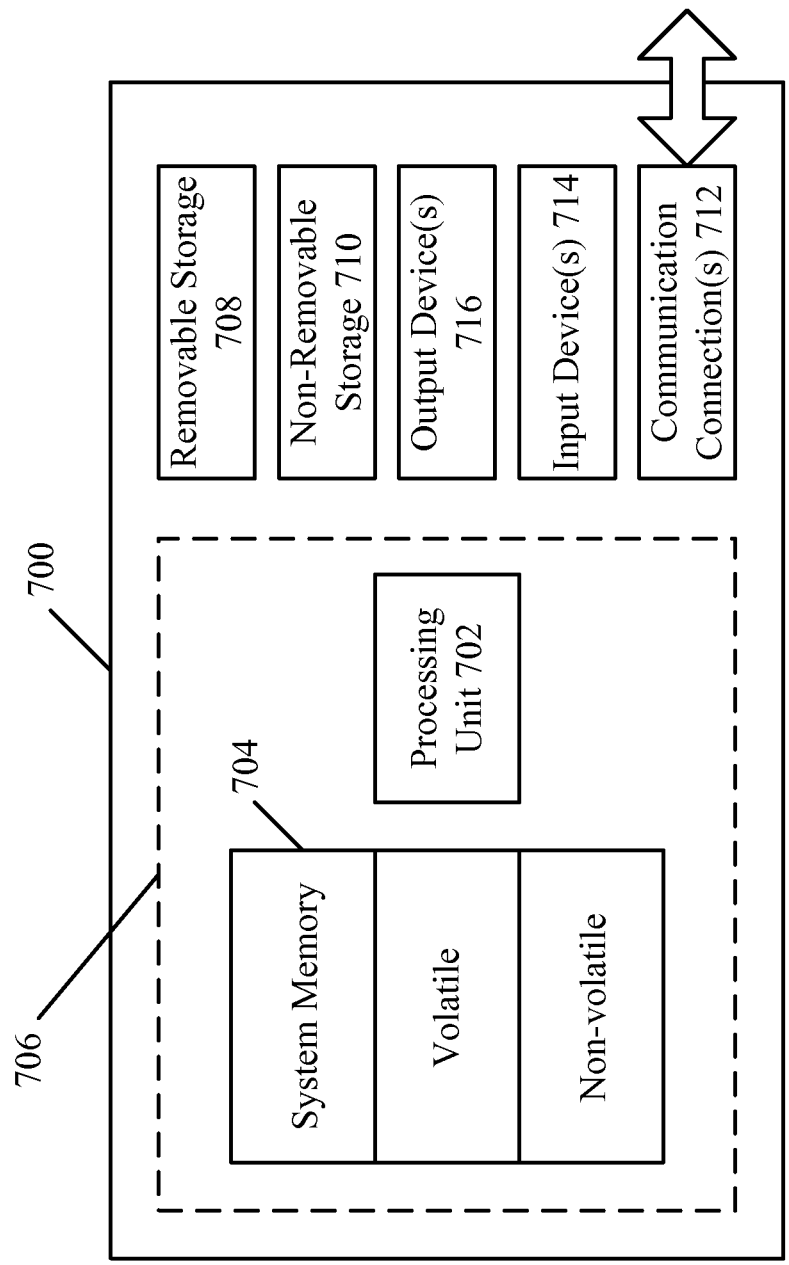
FIG. 7 is a block diagram of an example computing environment that may be used in connection with implementations of the subject matter described herein.

The subject matter described herein may be implemented through the use of a computer system, or other type of device that has some computing mechanism(s). FIG. 7 shows an example computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, mobile devices, smartphones, multiprocessor systems, microprocessor-based systems, network PCs, minicomputers, mainframe computers, embedded systems, distributed computing environments that include any of the previously-described systems or devices, and the like.

Computer-executable instructions, such as program modules, being executed by a computer may be used. Generally, program modules include routines, programs, objects, components, data structures, etc., that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 7, an example system for implementing aspects described herein includes a computing device, such as computing device 700. In its most basic configuration, computing device 700 typically includes at least one processing unit 702 and memory 704. Depending on the exact configuration and type of computing device, memory 704 may be volatile (such as random access memory (RAM)), non-volatile (such as read-only memory (ROM), flash memory, etc.), or some combination of the two. This most basic configuration is illustrated in FIG. 7 by dashed line 706.

Computing device 700 may have additional features/functionality. For example, computing device 700 may include additional storage (removable and/or non-removable) including, but not limited to, magnetic or optical disks or tape. Such additional storage is illustrated in FIG. 7 by removable storage 708 and non-removable storage 710.

Computing device 700 typically includes a variety of computer readable media. Computer readable media may be any available media that may be accessed by computing device 700 and includes both volatile and non-volatile media, removable and non-removable media. By way of example, and not limitation, computer readable media may comprise computer storage media and communication media.

Computer storage media includes volatile and non-volatile, removable and non-removable media implemented in any method or technology for storage of information such as computer readable instructions, data structures, program modules or other data. Memory 704, removable storage 708, and non-removable storage 710 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also contain communications connection(s) 712 that allow the device to communicate with other devices. Communications connection(s) 712 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

Computing device 700 may also have input device(s) 714 such as keyboard, mouse, pen, voice input device, touch input device, etc. Output device(s) 716 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs are preferably implemented in a high level procedural or object oriented programming language to communicate with a computer system. However, the program(s) may be implemented in assembly or machine language, if desired. In any case, the language may be a compiled or interpreted language, and combined with hardware implementations.

Although example embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described previously. Rather, the specific features and acts previously described are disclosed as example forms of implementing the claims.

The invention claimed is:

1. A non-transitory computer-readable medium comprising computer-readable instructions for generating a script to interact with a web site, the computer readable instructions comprising instructions executed to:

request that a person perform an interaction with the web site, wherein the website has a visit-to-visit dynamic credential request for a single account that includes a particular method to tender user credentials for each dynamic credential request when attempting to access the single account;

use co-browsing technology to create a record of said person's interaction with said web site over multiple iterations to account for the visit-to-visit dynamic credential request for the single account by observing the particular method to tender user credentials for each dynamic credential request when attempting to access the single account;

generate the script, which is executable by a script engine to cause the script engine to tender the user credentials for each visit-to-visit dynamic credential request to access the single account;

wherein the visit-to-visit dynamic credential request includes a plurality of different credential requests that are presented to tender a plurality of user credentials and wherein each visit to the website includes a particular one of the plurality of different credential requests and a tender of a corresponding user credential from the plurality of user credentials; and wherein said interaction includes said person's entering data into a data entry field that is associated with a text string, and wherein the computer-readable medium further comprises instructions executed to: compare said text string with a list of synonyms; and determine, based on said comparing, a type of data that is being entered into said data entry field, wherein the script, when executed, causes said script engine to enter said type of data into said data entry field.

2. The computer-readable medium of claim 1, further comprising instructions executed to:
request said person's permission to observe said person's interaction with said web site.

3. The computer-readable medium of claim 1, further comprising instructions executed to:
perform an analysis of said web site based on text contained in one or more pages of the web site; and
determine, based on said analysis, that at least one aspect of said web site cannot or will not be resolved based on the text contained in the web site.

4. The computer-readable medium of claim 1, further comprising instructions executed to:
use a heuristic to resolve at least one ambiguity in said record.

5. The computer-readable medium of claim 1, wherein said web site requests that said person react to data that changes between visits to said web site, and wherein the script, when executed, causes said script engine to perform an action that reacts to a particular instance of data that the web site provides when the script is being executed.

6. The computer-readable medium of claim 1, further comprising:
storing the script in a script database.

7. A system for generating a script to interact with a web site, the system comprising:
a memory,
a processor coupled to the memory to:
request that a person perform an interaction with the web site, wherein the website has a visit-to-visit dynamic credential request for a single account that includes a particular method to tender user credentials for each dynamic credential request when attempting to access the single account;
use co-browsing technology to create a record of said person's interaction with said web site over multiple iterations to account for the visit-to-visit dynamic credential request for the single account by observing the particular method to tender user credentials for each dynamic credential request when attempting to access the single account;
generate the script, which is executable by a script engine to cause the script engine to tender user credentials for each visit-to-visit dynamic credential request to access the single account;
wherein the visit-to-visit dynamic credential request includes a plurality of different credential requests that are presented to tender a plurality of user credentials and wherein each visit to the website includes a particular one of the plurality of different credential requests and a tender of a corresponding user credential from the plurality of user credentials; and
wherein said interaction includes said person's entering data into a data entry field that is associated with a text string, and wherein the system further comprises at least one subsystem that: compares said text string with a list of synonyms; and determines, based on said comparing, a type of data that is being entered into said data entry field, wherein the script, when executed, causes said script engine to enter said type of data into said data entry field.

8. The system of claim 7, further comprising at least one subsystem that:
requests said person's permission to observe said person's interaction with said web site.

9. The system of claim 7, further comprising at least one subsystem that:
performs an analysis of said web site based on text contained in one or more pages of the web site; and
determines, based on said analysis, that at least one aspect of said web site cannot or will not be resolved based on the text contained in the web site.

10. The system of claim 7, further comprising at least one subsystem that:
uses a heuristic to resolve at least one ambiguity in said record.

11. The system of claim 7, wherein said web site requests that said person react to data that changes between visits to said web site, and wherein the script, when executed, causes said script engine to perform an action that reacts to a particular instance of data that the web site provides when the script is being executed.

12. The system of claim 7, further comprising at least one subsystem that:
stores the script in a script database.

13. A method of generating a script to interact with a web site, the method comprising:
requesting that a person perform an interaction with the web site, wherein the website has a visit-to-visit dynamic credential request for a single account that includes a particular method to tender user credentials for each dynamic credential request when attempting to access the single account;
using co-browsing technology to create a record of said person's interaction with said web site over multiple iterations to account for the visit-to-visit dynamic credential request for the single account by observing the particular method to tender user credentials for each dynamic credential request when attempting to access the single account;
generating the script, which is executable by a script engine to cause the script engine to tender user credentials for each visit-to-visit dynamic credential request to access the single account;
wherein the visit-to-visit dynamic credential request includes a plurality of different credential requests that are presented to tender a plurality of user credentials and wherein each visit to the website includes a particular one of the plurality of different credential requests and a tender of a corresponding user credential from the plurality of user credentials; and wherein said interaction includes said person's entering data into a data entry field that is associated with a text string, and wherein the method further comprises: comparing said text string with a list of synonyms; and determining, based on said comparing, a type of data that is being entered into said data entry field, wherein the script, when executed, causes said script engine to enter said type of data into said data entry field.

14. The method of claim 13, further comprising:
requesting said person's permission to observe said person's interaction with said web site.

15. The method of claim 13, further comprising:
performing an analysis of said web site based on text contained in one or more pages of the web site; and
determining, based on said analysis, that at least one aspect of said web site cannot or will not be resolved based on the text contained in the web site.

16. The method of claim 13, further comprising:
using a heuristic to resolve at least one ambiguity in said record.

17. The method of claim 13, wherein said web site requests that said person react to data that changes between visits to said web site, and wherein the script, when executed, causes said script engine to perform an action that reacts to a particular instance of data that the web site provides when the script is being executed.

18. The method of claim 13, further comprising:
storing the script in a script database.

* * * * *